United States Patent [19]
Urata et al.

[11] Patent Number: 5,829,262
[45] Date of Patent: Nov. 3, 1998

[54] CAPACITY CONTROL DEVICE IN REFRIGERATING CYCLE

[75] Inventors: Kazumoto Urata, Shizuoka; Kensaku Oguni; Takeshi Endo, both of Shimizu, all of Japan

[73] Assignee: Hitachi, Ltd., Tokyo, Japan

[21] Appl. No.: 692,526

[22] Filed: Aug. 5, 1996

[30] Foreign Application Priority Data

Aug. 16, 1995 [JP] Japan .................................. 7-208809

[51] Int. Cl.$^6$ .............................. F25B 41/00; F25B 1/00
[52] U.S. Cl. ............................. 62/174; 62/196.1; 62/502
[58] Field of Search .................................. 62/196.1, 117, 62/509, 174, 502

[56] References Cited

U.S. PATENT DOCUMENTS

| 5,140,827 | 8/1992 | Reedy .......................................... 62/174 |
| 5,533,351 | 7/1996 | Miyata et al. .............................. 62/174 |
| 5,651,261 | 7/1997 | Nakajima et al. ......................... 62/509 |

FOREIGN PATENT DOCUMENTS 2-254263   10/1990   Japan .
7-139833    6/1995   Japan .

*Primary Examiner*—William E. Wayner
*Attorney, Agent, or Firm*—Antonelli, Terry, Stout & Kruas, LLP

[57] ABSTRACT

In a refrigerating cycle in which a constant speed type compressor, an indoor heat exchanger and an outdoor heat exchanger are connected one by one by means of piping, a receiver is provided between the indoor and outdoor heat exchangers, and no capacity control mechanism is provided for the compressor, a gas-liquid flow rate regulating device is associated with the receiver for regulating at least either of liquid flow rate and gas flow rate of a cooling fluid which flows into and out of the receiver. This causes a quantity of excess refrigerant stored in the receiver to change to thereby vary an effective quantity of refrigerant circulating through the refrigerating cycle.

18 Claims, 10 Drawing Sheets

CAPACITY CONTROL DEVICE IN REFRIGERATING CYCLE

BACKGROUND OF THE INVENTION

This invention relates to a refrigerating cycle and more particularly to a capacity control device in a refrigerating cycle, which regulates an effective quantity of refrigerant circulating through the refrigerating cycle to vary a performance of an indoor heat exchanger automatically in response to a load in a room or a performance desired by a user.

In general, a refrigerating cycle is controlled in capacity by varying frequencies at which a compressor is operated or by controlling a capacity of a heat exchanger. A method, in which capacity is controlled by varying an operating frequency of a compressor in response to an air-conditioning load, has been put into practice in such a manner that the refrigerating cycle is provided with a compressor, which has mounted thereon an operating frequency variable control device (such as an inverter) and a motor adapted to the operating frequency variable control device, and a quantity of refrigerant circulating through the refrigerating cycle is controlled by controlling the operating frequency.

Meanwhile, Japanese Patent Unexamined Publication No. 2-254263 discloses a method in which a capacity of a refrigerating cycle is controlled by controlling a capacity of a heat exchanger.

In this publication, a condenser provided in an outdoor unit casing is divided into two condenser elements, one of which is arranged in an upper portion where a large air volume flows through a ventilation passage to serve as an upper condenser and the other of which is arranged in lower portion where a small air volume flows through the ventilation passage to serve as a lower condenser. The upper and lower condensers are connected in series, a refrigerant bypass circuit is so provided as to bypass the upper condenser, and a two-way valve is provided a midway along the refrigerant bypass circuit to serve as a bypass valve. Capacity control is performed in such a manner that the two-way valve is opened to cause a refrigerant to flow into the lower condenser positively to thereby reduce a capacity of the condenser which acts effectively in the refrigerating cycle.

In a refrigerating cycle having a compressor provided with a constant speed type motor, it is impossible to control a circulation quantity of refrigerant circulating through the refrigerating cycle, and therefore it has been impossible to vary a capacity of the refrigerating cycle.

Further, according to the above-described prior art (Japanese Patent Unexamined Publication No. 2-254263), the capacity of the condenser cannot be varied arbitrarily, and therefore it has been impossible to perform the capacity control of the refrigerating cycle continuously. Moreover, a solenoid valve is opened and closed as means for performing the capacity control, and therefore at the time of the opening and closing operation of the solenoid valve, the flow of refrigerant is hindered suddenly and hence the refrigerating cycle is changed abruptly, resulting in an unstable operation of the refrigerating cycle in some cases.

SUMMARY OF THE INVENTION

It is an object of the present invention to provide a capacity control device in a refrigerating cycle which is capable of varying a capacity of the refrigerating cycle continuously without increasing a quantity of refrigerant as well as maintaining the refrigerant cycle in stable conditions even in a refrigerating cycle having a compressor provided with a constant speed type motor, while overcoming the above-described problems of the prior at.

In is another object of the present invention to provide a capacity control device in a refrigerating cycle which is capable of controlling a capacity over a remarkably enlarged scale as compared with a capacity control effected in a refrigerating cycle having a compressor running revolution speed variable control device.

In order to achieve the above end, a capacity control device in a refrigerating cycle according to the present invention comprises a first pressure reducing device provided on the side of an indoor heat exchanger side, a second pressure reducing device provided on an outdoor heat exchanger side, and a gas-liquid flow rate regulating means provided on a receiver for regulating at least either of liquid flow rate and gas flow rate of a cooling fluid which flows into and out of the receiver. An effective quantity of refrigerant is varied to change a condensing temperature in an indoor heat exchanger depending upon a difference between a required capacity and a produced capacity.

A capacity control device in a refrigerating cycle according to the present invention comprises a first pressure reducing device provided on an indoor heat exchanger side, a second pressure reducing device provided on an outdoor heat exchanger side, and a dryness adjusting means associated with a receiver for adjusting dryness of a cooling fluid which flows into and out of the receiver. The dryness is varied to change a condensing temperature in an indoor heat exchanger depending upon a difference between a required capacity and a produced capacity.

A capacity control device in a refrigerating cycle according to the present invention comprises a first pressure reducing device provided on an indoor heat exchanger side, a second pressure reducing device provided on an outdoor heat exchanger side, and a gas hole formed in a refrigerant inflow/outflow pipe, by which a main pipe of the refrigerating cycle is connected to an interior of a receiver, so as to communicate with an upper gas portion in the receiver.

A capacity control device in a refrigerating cycle according to the present invention comprises a first pressure reducing device provided on an indoor heat exchanger side, a second pressure reducing device provided on an outdoor heat exchanger side, a gas hole formed in a refrigerant inflow/outflow pipe, by which a main pipe of the refrigerating cycle is connected to an interior of a receiver, so as to communicate with an upper gas portion in the receiver, and a small-diameter refrigerant inflow/outflow pipe, a portion of which located below the gas hole is reduced in diameter.

A capacity control device in a refrigerating cycle according to the present invention comprises a first pressure reducing device provided on an indoor heat exchanger side, a second pressure reducing device provided on an outdoor heat exchanger side, and a bypass pipe so provided as to cause gas in a receiver to bypass toward downstream of a refrigerant inflow/outflow pipe, by which a main pipe of the refrigerating cycle is connected to an interior of the receiver, or the main pipe with respect to a direction of flow. The bypass pipe is provided with at least a gas flow rate regulating valve for regulating gas flow rate.

Preferably, a capacity control device in a refrigerating cycle according to the present invention further comprises a revolution speed varying means for varying revolution speed of a compressor.

It is preferred that, in a capacity control device in a refrigerating cycle according to the present invention, a mixed refrigerant made up by mixing at least two kinds of refrigerants of different boiling points is used as the cooling fluid.

Preferably, in the present invention, components of the mixed refrigerant are difluoromethane, 1,1,1,2-tetrafluoroethane, pentafluoroethane and 1,1,1-trifluoroethane.

According to the present invention, in a refrigerating cycle in which a compressor, an indoor heat exchanger and an outdoor heat exchanger are connected one by one by means of piping and a receiver is provided between the indoor and outdoor heat exchangers, a capillary tube having a fixed resistance is used as a pressure reducing device, by which an amount of pressure reduction is adjusted in such a manner that a quantity of state of the refrigerating cycle is made appropriate in heating and cooling operations.

The gas-liquid flow rate regulating means serves to regulate at least either of liquid flow rate and gas flow rate of the cooling fluid flowing into and out of the receiver in a gas-liquid mixed state to obtain a certain ratio of liquid flow rate to gas flow rate. In practice, a bypass pipe is so provided as to extend from an upper portion of the receiver to bypass the pipes arranged before and after the receiver, and means for regulating a flow rate of gas flowing out of the receiver, such as an electronic expansion valve, for example, is provided midway in a pipe which extends from above and is connected to the bypass pipe, thereby obtaining the gas-liquid flow rate regulating means.

Owing to the gas-liquid flow rate regulating means, a quantity of refrigerant circulating through the refrigerating cycle changes depending on a ratio of gas flow rate to liquid flow rate adjusted by the gas-liquid flow rate regulating means as well as an amount of pressure reduction in the pressure reducing device. Particularly, a quantity of liquid refrigerant remaining in the heat exchanger serving as a condenser is changed. In the case of increasing a liquid flow rate or decreasing a gas flow rate with an amount of pressure reduction in the pressure reducing device being constant, a quantity of liquid stored in the indoor heat exchanger increases, and therefore a discharge pressure is increased and a condensing temperature is raised to thereby increase a capacity. Meanwhile, in the case of decreasing a liquid flow rate or increasing a gas flow rate, a quantity of liquid stored in the indoor heat exchanger is reduced, and therefore a discharge pressure is decreased and a condensing temperature is lowered to thereby reduce a capacity. Accordingly, by regulating a liquid flow rate or a gas flow rate of the cooling fluid flowing into and out of the receiver by means of the gas-liquid flow rate regulating means, it is possible to vary a capacity of the refrigerating cycle.

As a consequence, it is possible to vary a capacity even in a refrigerating cycle provided with a constant speed type compressor having no compressor capacity control mechanism. Further, the refrigerating cycle can be selectively operated between an energy saving mode and a capacity precedence mode, and therefore it becomes possible to operate the refrigerating cycle at a user's desire by selecting these operation modes.

The dryness adjusting means serves to regulate a gas flow rate of the cooling fluid flowing into and out of the receiver in a gas-liquid mixed state to obtain a certain ratio of liquid flow rate to gas flow rate. In practice, a bypass pipe is so provided as to extend from an upper portion of the receiver to bypass the pipes arranged before and after the receiver, and means for regulating a flow rate of gas flowing out of the receiver, such as an electronic expansion valve, for example, is provided midway in a pipe which extends from above and is connected to the bypass pipe, thereby obtaining the dryness adjusting means.

Owing to this dryness adjusting means, the cooling fluid flowing into the receiver is adjusted to be of a certain percentage of dryness. Therefore, a quantity of refrigerant circulating through the refrigerating cycle changes depending on a refrigerant dryness adjusted by the dryness adjusting means as well as an amount of pressure reduction in the pressure reducing device. Particularly, a quantity of liquid refrigerant stored in the heat exchanger serving as a condenser is changed. In the case of decreasing dryness with an amount of pressure reduction in the pressure reducing device kept constant, a quantity of liquid stored in the indoor heat exchanger increases, and therefore a discharge pressure is increased and a condensing temperature is raised to thereby increase a capacity of the refrigerating cycle. Meanwhile, in the case of increasing dryness, a quantity of liquid stored in the indoor heat exchanger is reduced, and therefore a discharge pressure is decreased and a condensing temperature is lowered to thereby reduce a capacity of the refrigerating cycle. Accordingly, by adjusting a dryness of the cooling fluid flowing into and out of the receiver by means of the dryness adjusting means, it is possible to vary a capacity of the refrigerating cycle.

Further, as for the gas-liquid flow rate regulating means or the dryness adjusting means, a refrigerant inflow/outflow pipe, by which the main pipe of the refrigerating cycle is connected to the inside of the receiver, is formed with a gas hole or holes communicating with an upper gas portion in the receiver. With such arrangement, regulation of a flow rate of gas flowing into and out of the refrigerant inflow/outflow pipe and adjustment of a dryness can be effected by varying a size, number and position of the gas hole or holes, with the result that it is possible to vary a capacity of the refrigerating cycle with a simple structure.

Moreover, by reducing a diameter of a portion of the refrigerant inflow/outflow pipe below the gas hole, it is possible to make the refrigerant flow into and out of the receiver at a fixed ratio of gas flow rate to liquid flow rate regardless of the quantity of liquid refrigerant stored in the receiver. Accordingly, the refrigerating cycle can be stabilized irrespective of a quantity of charged refrigerant.

In addition, a bypass pipe is so provided as to cause gas in the receiver to be bypassed to a downstream side of the refrigerant inflow/outflow pipe, by which the main pipe of the refrigerating cycle is connected to an interior of the receiver, or the main pipe in a direction of flow, and the bypass pipe is provided with at least a gas flow rate regulating valve for regulating a gas flow rate, and therefore a ratio of gas flow rate to liquid flow rate at which the refrigerant flows into and out of the receiver can be adjusted freely, with the result that a capacity of the refrigerating cycle can be controlled arbitrarily during operation.

Furthermore, as for the pressure reducing device provided in the above-described refrigerating cycle, an electronic expansion valve is used at least for the pressure reducing device which is disposed upstream of the receiver with respect to the direction of the flow of cooling fluid, and therefore the state at the condenser outlet can be adjusted by an amount of pressure reducion of the electronic expansion valve, with the result that a capacity of the refrigerating cycle can be controlled arbitrarily during the operation.

Besides, as capacity variable means for varying a capacity of the compressor, a compressor capacity variable control circuit for varying the revolution speed of the compressor and a microcomputer are provided on the compressor provided in the refrigerating cycle. Therefore, it is possible to additionally apply a capacity change effected by varying a capacity of the compressor, with the result that the capacity of the refrigerating cycle can be changed more widely.

Additionally, a mixed refrigerant made up by mixing at least two kinds of refrigerants of different boiling points is used for the cooling fluid of the refrigerating cycle, and therefore an amount of change between a composition of the charged refrigerant and a composition of the refrigerant circulating through the refrigerating cycle is different between a case where excess refrigerant is stored in the receiver and a case where excess refrigerant is stored in a tank provided on a lower pressure side of an accumulator on the like because of a change in refrigerant dryness, thereby varying a characteristics of the mixed refrigerant, with the result that a range of capacity control of the refrigerating cycle can be enlarged.

Moreover, components of the above-described mixed refrigerant are difluoromethane, 1,1,1,2-tetrafluoroethane, pentafluoroethane and 1,1,1-trifluroethane, which contain no chlorine, and therefore it is possible to avoid destruction of the ozone layer. Accordingly, it is possible to produce a capacity corresponding to a load in air-conditioning space and provide an air-conditioned space which will do no harm to the global environment.

DESCRIPTION OF THE PREFERRED EMBODIMENTS

Description will be given below of preferred embodiments according to the present invention with reference to FIGS. 1 to 14.

A first embodiment of the present invention will be described first with reference to FIGS. 1 to 5.

Figure 1:
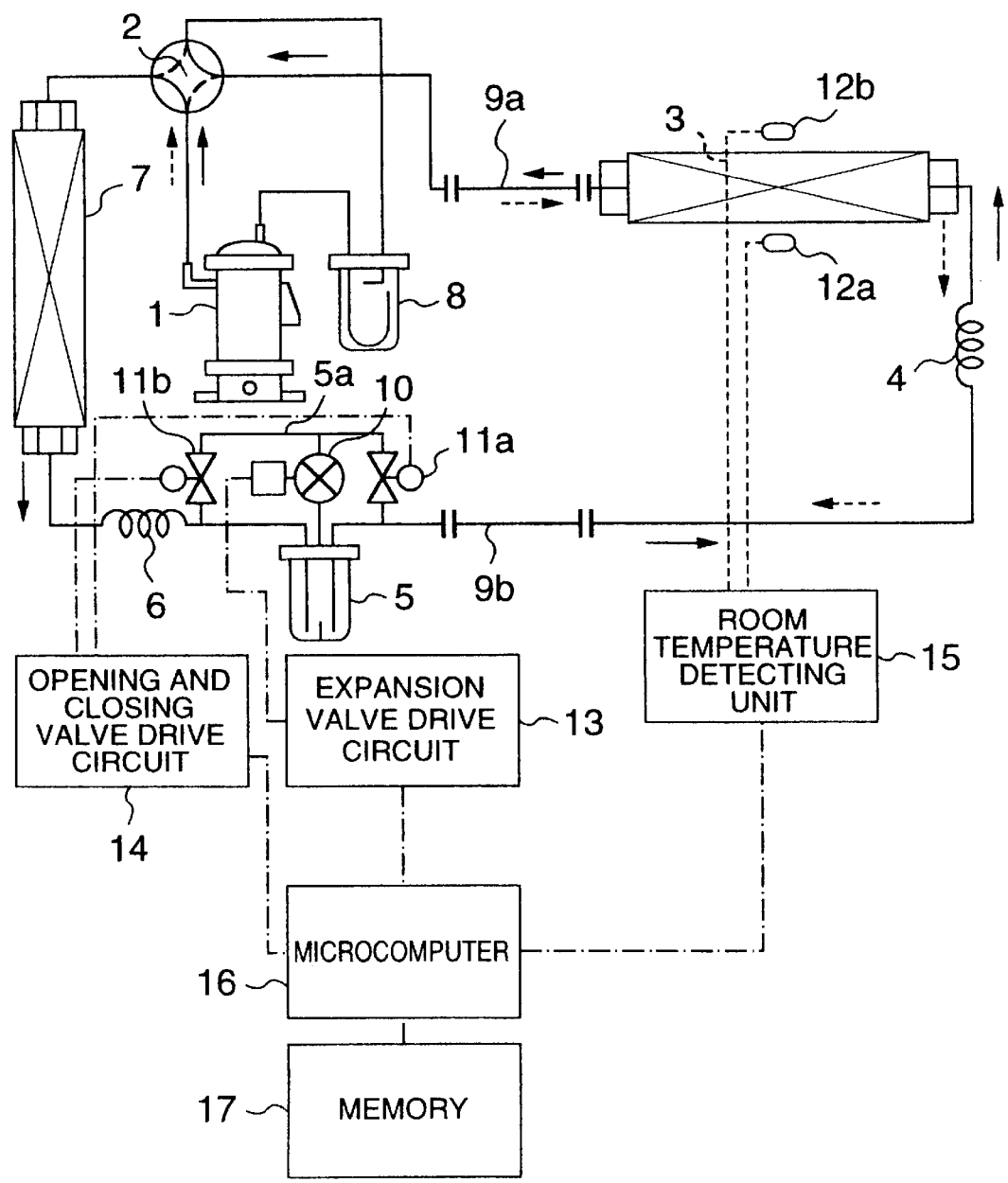
FIG. 1 is a schematic view of a capacity control cycle provided with fixed pressure reducing devices, according to an embodiment of a refrigerating cycle of the present invention.
Figure 2:
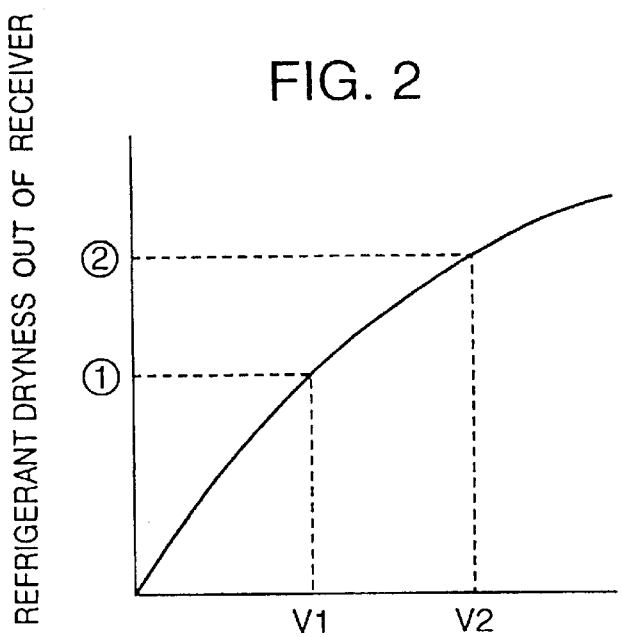
FIG. 2 is a graph showing a relationship between valve opening degree of a gas flow rate regulating device and refrigerant dryness in a receiver.
Figure 3:
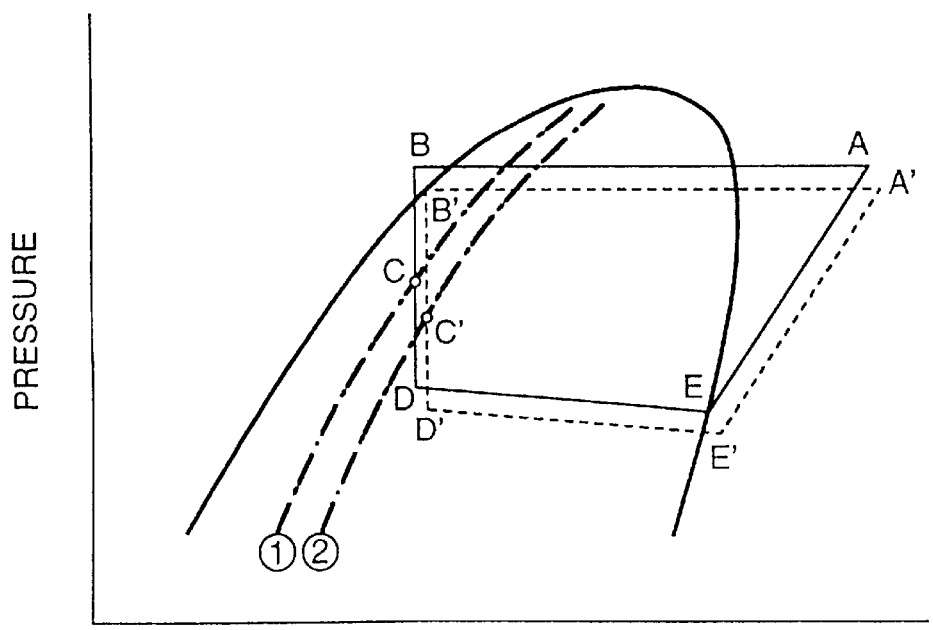
FIG. 3 is a Mollier diagram showing operation points of the capacity control cycle with fixed pressure reducing devices.
Figure 4:
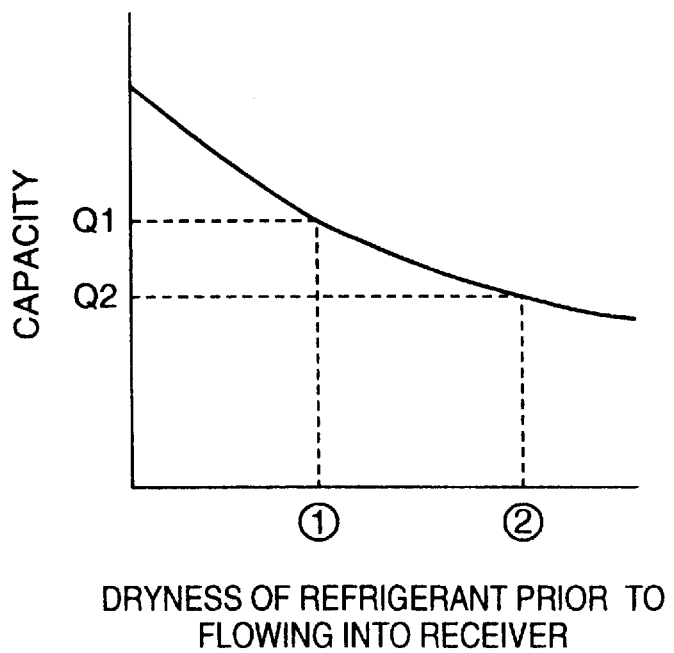
FIG. 4 is a graph showing a relationship between refrigerant dryness and a capacity of the refrigerating cycle.
Figure 5:
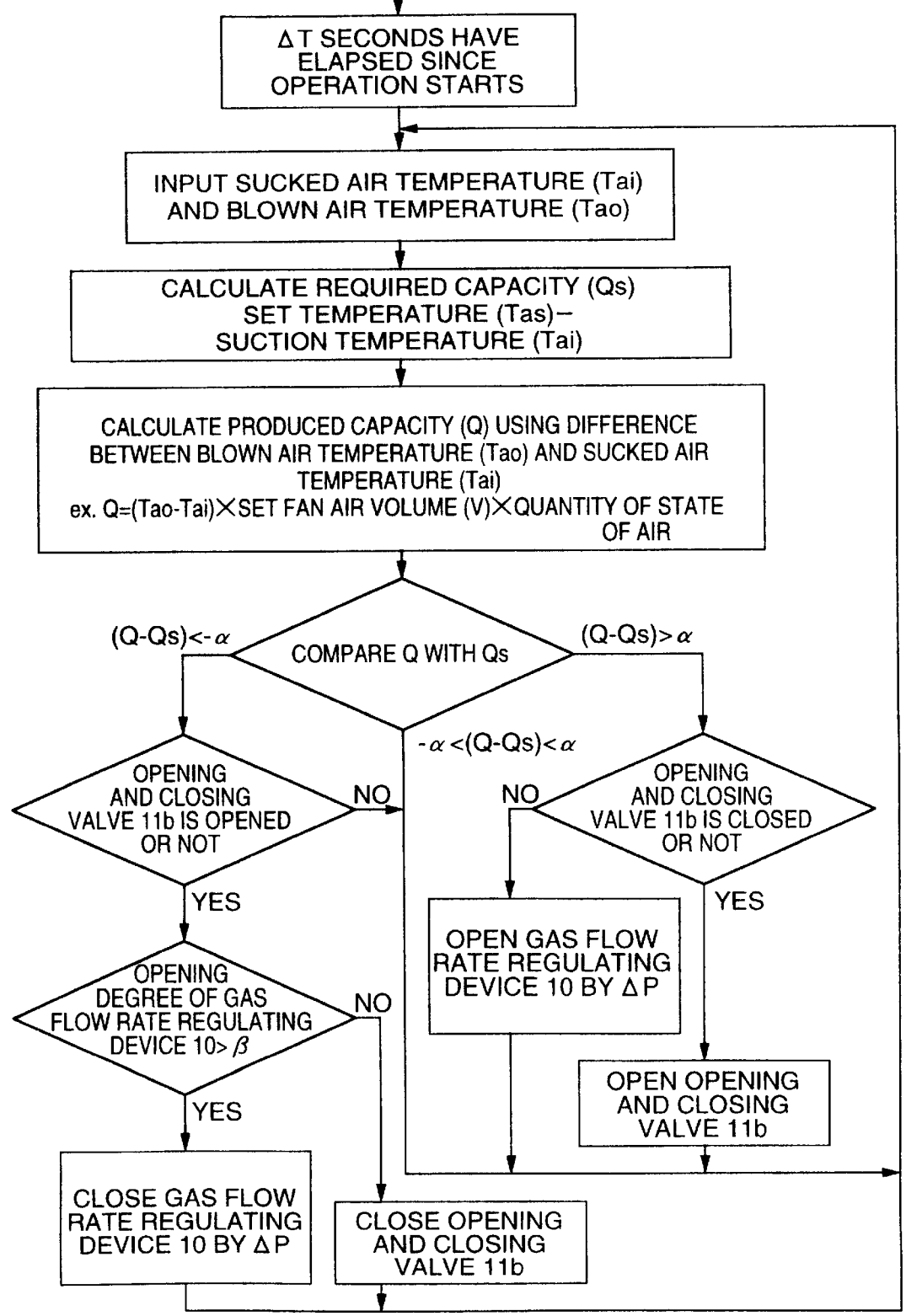
FIG. 5 is a flow chart of the capacity control cycle with a fixed pressure reducing device in heating operation.

FIG. 1 is a schematic view of a capacity control cycle having fixed pressure reducing devices, FIG. 2 is a graph showing a relationship between a valve opening degree of a gas flow rate regulating device and refrigerant dryness in a receiver, FIG. 3 is a Mollier diagram showing operation points of the capacity control cycle of FIG. 1, FIG. 4 is a graph showing a relationship between a refrigerant dryness and a capacity of the refrigerating cycle, and FIG. 5 is a flow chart of the capacity control cycle of FIG. 1 in heating operation.

A refrigerating cycle shown in FIG. 1 comprises a compressor 1, a four-way valve 2, an indoor heat exchanger 3, a first pressure reducing device 4, a receiver 5, a second pressure reducing device 6, an outdoor heat exchanger 7 and an accumulator 8, which are connected one by one by means of a gas connection piping 9a and a liquid connection piping 9b to form a closed loop.

The first and second pressure reducing devices are each made of a capillary tube having a fixed resistance and adjusted to properly reduce pressures in both heating and cooling operations. The receiver 5 is provided between the first pressure reducing device 4 arranged on a side of the indoor heat exchanger 3 and the second pressure reducing device 6 on a side of the outdoor heat exchanger 7 to collect and store excess refrigerant produced in the refrigerating cycle.

The receiver 5 is provided with a bypass pipe 5a, which serves as a gas-liquid flow rate regulating means, and bypasses an upper portion of the receiver 5 to pipes arranged before and behind the receiver 5. The respective pipes are provided with opening and closing valves 11a and 11b, respectively, and a gas flow rate regulating device 10 (an electronic expansion valve, for example) is provided midway along a pipe, by which an upper portion of the receiver 5 is connected to the bypass pipe 5a, for the purpose of regulating a flow rate of gas flowing out of the receiver 5.

By regulating a quantity of gas refrigerant flowing out of the receiver 5, dryness or wetness of the refrigerant flowing into and out of the receiver 5 can be adjusted.

A single refrigerant or at least two kinds of refrigerants of different boiling points are charged or sealed in the refrigerating cycle to an amount corresponding to the maximum length of connection piping and caused to flow through the refrigerating cycle as shown by arrows of solid and broken lines in FIG. 1.

Further, a control system is connected to these devices constituting the refrigerating cycle. The control system will be described later in detail.

Now, an action of the refrigerating cycle which is in operation will be described. For the convenience of explanation, it is assumed that a single refrigerant is charged in the refrigerating cycle, and description will be given of only the case of heating operation. Even if the refrigerant charged in the refrigerating cycle is a mixed refrigerant, or even in the case of cooling operation shown by the arrows of solid line in FIG. 1, the same effect can be obtained.

As shown in FIG. 1, by changing over the four-way valve 2 as indicated by broken line, a heating operation mode is set. Refrigerant is caused to flow in a direction shown by arrows of broken line, i.e., through the compressor 1, the four-way valve 2, the indoor heat exchanger 3, the first pressure reducing device 4, the receiver 5, the second pressure reducing device 6, the outdoor heat exchanger 7, the four-way valve 2, the accumulator 8, and returns to the compressor 1. The refrigerant compressed to be raised in pressure and temperature by the compressor 1 flows through the gas connection piping 9a into the indoor heat exchanger 3 where it discharges heat to an air circulating through the indoor heat exchanger 3 to be condensed into a liquid refrigerant.

The liquid refrigerant thus condensed is reduced in pressure by the first pressure reducing device 4 to turn into a liquid state or gas-liquid two-phase state to be introduced through the liquid connection piping 9b into the receiver 5. Then, the liquid refrigerant or the gas-liquid two-phase refrigerant flows out of the receiver 5 through a refrigerant inflow/outflow pipe of the receiver 5. The gas flow rate regulating device 10 provided above the receiver 5 and the switch valve 11b cause gas refrigerant in the receiver 5 to be extracted to be mixed with the refrigerant outflowing through the refrigerant inflow/outflow pipe and adjusted to be in the same state as the refrigerant which flows into the receiver 5. The refrigerant is then reduced in pressure by the second pressure reducing device 6 down to a predetermined pressure and thereafter flows into the outdoor heat exchanger 7.

The refrigerant flowing in the outdoor heat exchanger 7 absorbs heat from the air circulating through the outdoor heat exchanger 7 and evaporates into vapor which flows through the four-way valve 2 into the accumulator 8. In the accumulator 8, dryness or wetness of the refrigerant which is to be returned to the compressor 1 is adjusted. The refrigerant is then drawn into the compressor 1.

Description will be given of the gas flow rate regulating device 10 associated with the receiver 5 and the state and the effect on the refrigerating cycle of the refrigerant which flows into and out of the receiver 5.

FIG. 2 shows a relationship between a valve opening degree of the gas flow rate regulating device 10 taken as the abscissa and the refrigerant dryness in the receiver 5 taken as the ordinate, and FIG. 3 is a Mollier diagram showing operation points of the refrigerating cycle provided with fixed pressure reducing devices in the case where the valve opening degree of the gas flow rate regulating device 10 is adjusted. FIG. 4 is a graph showing a relationship between the refrigerant dryness taken as the abscissa and the heating power taken as the ordinate.

If a valve opening degree of the gas flow rate regulating device 10 is increased from V1 to V2 as shown in FIG. 2, a refrigerant flow passage in the gas flow rate regulating device 10 is enlarged, so that a flow rate of gas passing through the gas flow rate regulating device 10 is increased. For this reason, the state of the refrigerant flowing out of the receiver 5 is put in an operating point on a curve 2 in FIG. 3, in which dryness becomes high or wetness becomes low as the valve opening degree of the gas flow rate regulating device 10 increases.

The refrigerant flowing into the receiver 5 is in a state at a operating point on a curve 1, in which dryness is low or wetness is high at first, and the refrigerant flowing out of the receiver 5 is in the state shown by the curve 2, and therefore a quantity of liquid refrigerant flowing out of the receiver 5 is smaller than that of liquid refrigerant flowing into the receiver 5. Accordingly, the liquid refrigerant is collected and stored in the receiver 5, so that an effective quantity of refrigerant circulating through the refrigerating cycle is decreased. As a result, the refrigerant flowing into the receiver 5 is put in the state shown by the curve 2.

When the refrigerant is put in the same state when flowing into and out of the receiver 5, reduction in effective quantity of refrigerant circulating through the refrigerating cycle stops and the refrigerating cycle becomes stable. Namely, dryness or wetness of the refrigerant flowing into or out of the receiver 5 can be changed from the state shown by the curve 1 to that shown by the curve 2 by increasing a quantity of gas refrigerant flowing out of the receiver 5, or by increasing a valve opening degree of the gas flow rate regulating device 10 from V1 to V2.

An operation point of the refrigerating cycle in the case of the valve opening degree being V1 shifts via E (suction into compressor), A (discharge from compressor), B (outlet of indoor heat exchanger), C (inside receiver) and D (inlet of outdoor heat exchanger) as shown by the solid line of Mollier diagram in FIG. 3.

On the other hand, in the case of the valve opening degree being V2, an effective quantity of refrigerant circulating through the refrigerating cycle decreases, so that a quantity of liquid refrigerant collecting in the indoor heat exchanger 3 decreases as well to reduce the discharge pressure. Since the first and second pressure reducing devices 4 and 6 are fixed resistances, a pressure in the receiver 5 is also lowered and a pressure at an inlet 7 of the outdoor heat exchanger is lowered as well. Therefore, the operation point shifts via E' (suction into compressor), A' (discharge from compressor), B' (outlet of indoor heat exchanger), C' (inside of receiver), and D' (inlet of outdoor heat exchanger) as shown by broken lines of Mollier diagram in FIG. 3.

A heating capacity of the refrigerating cycle at this time is reduced from Q1 to Q2 as shown in FIG. 4 due to the fact that a condensing temperature lowers in the indoor heat exchanger 3 to become less different from the air temperature, thereby reducing an amount of heat discharged to air. Thus, an evaporating temperature lowers in the outdoor heat exchanger 7 to become less different from the air temperature, thereby reducing an amount of heat absorbed from air. A reduction in suction pressure of the compressor and an increase in degree of superheat of the refrigerant on the suction side of the compressor result in reduction in refrigerant circulation quantity.

Namely, a capacity of the refrigerating cycle can be varied by adjusting a valve opening degree of the gas flow rate regulating device 10 associated with the receiver 5.

Now, an example of a method of controlling a refrigerating cycle according to the present invention will be described.

FIG. 5 is a flow chart at the time of heating operation. An electronic expansion valve can be used as the gas flow rate regulating device 10 shown in FIG. 1.

A control system of the refrigerating cycle comprises, as shown in FIG. 1, a microcomputer 16, a memory 17 connected to the microcomputer 16, an expansion valve drive circuit 13 for driving the gas flow rate regulating device 10, an opening and closing valve drive circuit 14 for driving the opening and closing valves 11a, 11b provided in the respective bypass circuits, a room temperature detecting unit 15 for detecting suction and discharge temperatures of the indoor heat exchanger 3, and temperature detectors 12a, 12b connected to the room temperature detecting unit 15.

The memory 17 stores set values based on which a capacity of the refrigerating cycle is controlled. These set values are retrieved from the memory 17 at the request of the microcomputer 16. The room temperature detecting unit 15 receives detected values of suction air temperature and discharge air temperature of the indoor heat exchanger 3 from the temperature detectors 12a, 12b, and transmits the detected temperatures into electric signals which are sent to the microcomputer 16.

The microcomputer 16 receives the detected values from the above-described units and sends a computed value of opening degree of the gas flow rate regulating device 10, which is an electronic expansion valve, and signals indicative of opening/closing of the opening and closing valves 11a, 11b to the expansion valve drive circuit 13 and the opening and closing valve drive circuit 14, respectively.

In the heating operation, as shown in FIG. 5, after the lapse of $\Delta T$ seconds since start-up of operation, the room temperature detecting unit 15 detects a suction air temperature Tai and a blowout air temperature Tao of the indoor heat exchanger 3, the values thus detected being inputted to the microcomputer 16.

At present, a capacity Qs required for the refrigerating cycle is calculated from a difference between a set room temperature Tas set by a user or other person with a remote controller or the like, for example, and the present suction air temperature Tai based on the values inputted to the microcomputer 16.

A capacity Q produced by the refrigerating cycle is calculated based on the values inputted from the temperature detecting unit 15 by multiplying a difference between the blown-out air temperature Tao and the suction air temperature Tai of the indoor heat exchanger 3 by a fan air volume V set by the remote controller or the like and a quantity of state of air (specific weight and specific heat of air), for example.

Then, a difference between the produced capacity Q and the required capacity Qs is compared with a value a set beforehand in the memory 17.

In the case of $(Q-Qs)<-\alpha$, the produced capacity Q is lower than the required capacity Qs, and therefore a condensing temperature of the indoor heat exchanger 3 must be raised. So it is judged first whether or not the opening and closing valve 11b is opened.

In the case where the opening and closing valve 11b is opened, an opening degree of the gas flow regulating device 10 is closed by $\Delta P$ if it is larger than a minimum opening degree $\beta$ set beforehand in the memory 17, but the opening and closing valve 11b must be closed to completely shut off leakage of gas from the gas flow rate regulating device 10 if an opening degree of the gas flow rate regulating device 10 is smaller than $\beta$.

On the other hand, in the case where the opening and closing valve 11b is closed, the refrigerating cycle can generate a maximum capacity but it cannot generate any higher capacity, and therefore the operation is performed as it is.

In the case of $-\alpha<(Q-Qs)<\alpha$, the required capacity Qs and the produced capacity Q are equal to each other, and therefore the operation is performed while keeping the present conditions.

In the case of $(Q-Qs)>\alpha$, the produced capacity Q is higher than the required capacity Qs, and therefore a condensing temperature of the indoor heat exchanger 3 may be lowered. So it is judged first whether or not the opening and closing valve 11b is opened, and the opening and closing valve 11b is made open if it is judged to be closed, while if opened, the gas flow rate regulating device 10 is opened by $\Delta P$ to permit the liquid refrigerant to be stored in the receiver 5 to reduce an effective quantity of refrigerant in the refrigerating cycle to thereby lower a condensing temperature, in which conditions the operation is performed.

As described above, by regulating a flow rate of gas flowing through the gas flow rate regulating device 10 associated with the receiver 5, a capacity of the refrigerating cycle can be varied in response to a load in air-conditioning space even in a refrigerating cycle provided with a constant speed type compressor which has no capacity control means. Further, in the case where the refrigerant flowing into and out of the receiver is made in a state that dryness is high (wetness is low), an effective quantity of refrigerant in the refrigerating cycle is reduced, so that a discharge pressure is decreased to thereby reduce an amount of electricity supply to the compressor. Accordingly, a switch on is provided a remote controller or the like so as to selectively operate the refrigerating cycle with precedence taken to energy saving or capacity, whereby, it becomes possible to operate the refrigerating cycle in various operation modes and hence it becomes possible to operate the air conditioner in a manner desired by a user or other person.

In this embodiment, while the gas-liquid flow rate regulating means has been described as being constituted to regulate a quantity of gas refrigerant flowing out of the receiver, a similar result is attained in the case where such means may be constituted to be capable of regulating a quantity of liquid refrigerant flowing out of the receiver on the assumption that the gas refrigerant flowing out of the receiver is constant.

Another embodiment will now be described with reference to FIGS. 6 to 9.

Figure 6:
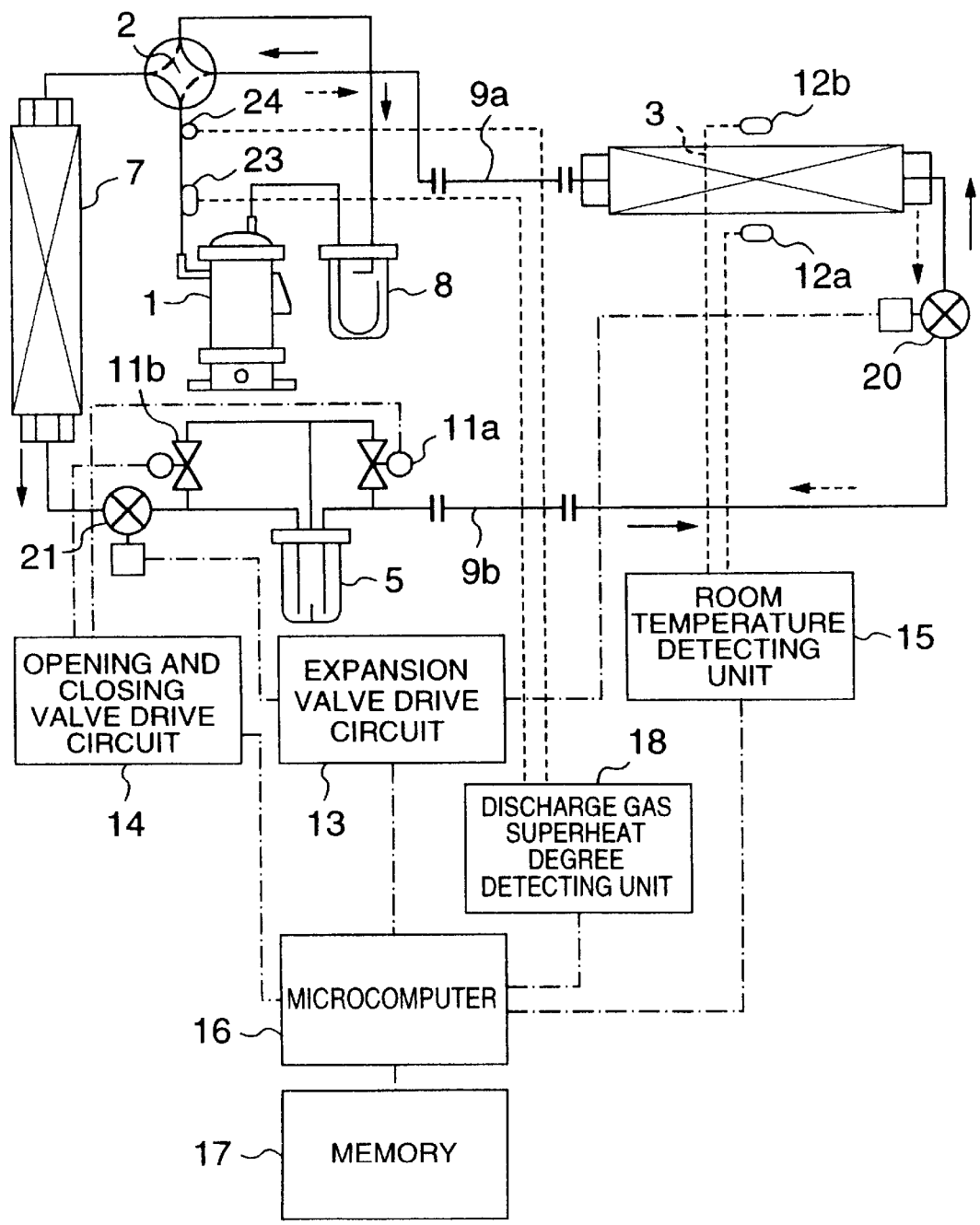
FIG. 6 is a schematic view of a capacity control cycle provided with an electronic expansion valve as variable pressure reducing devices, according to another embodiment of a refrigerating cycle of the present invention.
Figure 7:
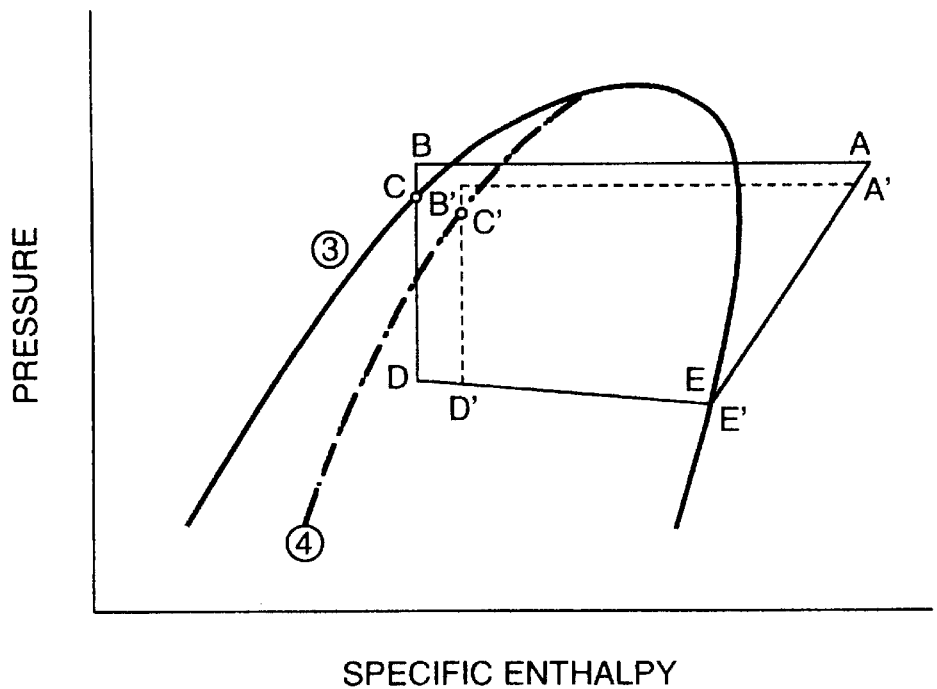
FIG. 7 is a Mollier diagram showing operation points of the capacity control cycle with variable pressure reducing devices.
Figure 8:
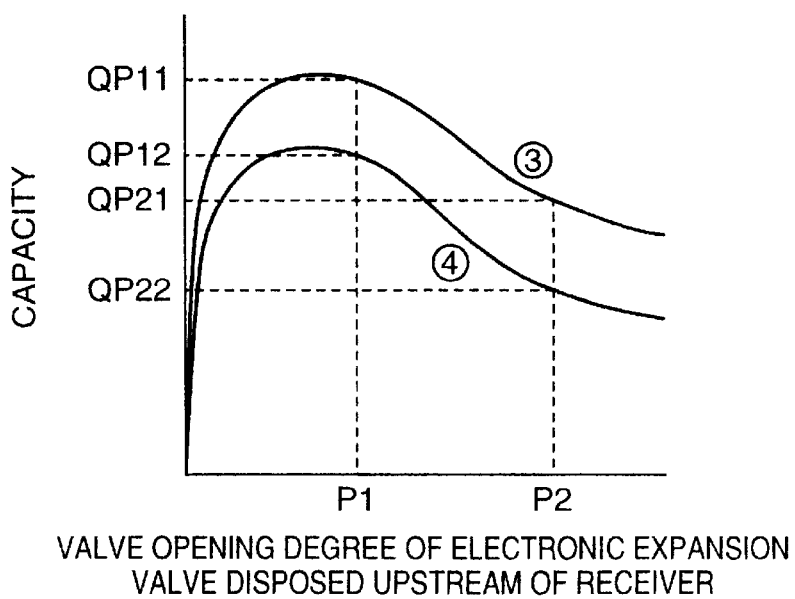
FIG. 8 is a graph showing a relationship between a valve opening degree of an electronic expansion valve, which is disposed upstream of the receiver with respect to a direction of flow of refrigerant and a capacity.
Figure 9:
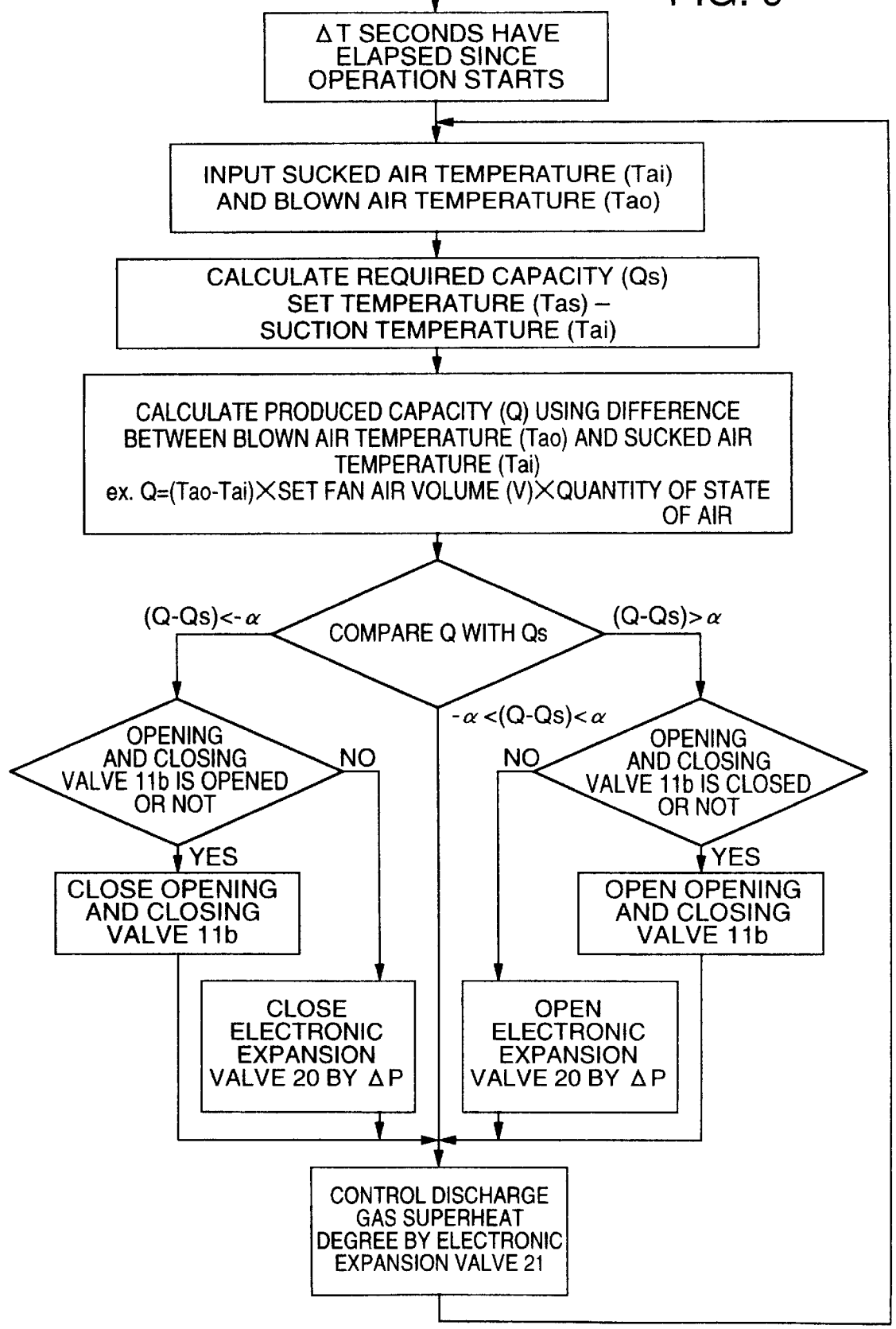
FIG. 9 is a flow chart of a capacity control cycle with a variable pressure reducing device in heating operation.

FIG. 6 is a schematic view of a capacity control cycle having electronic expansion valves as variable pressure reducing device, FIG. 7 is a Mollier diagram showing operation points of the capacity control cycle of FIG. 6, FIG. 8 is a graph showing a relationship between a valve opening degree of an electronic expansion valve and capacity, and FIG. 9 is a flow chart of the capacity control cycle of FIG. 6 in heating operation.

In the refrigerating cycle of the embodiment shown in FIG. 6, the first and second pressure reducing devices 4 and 6 shown in FIG. 1 are replaced by first and second electronic expansion valves 20 and 21, which are capable of adjusting an amount of pressure reduction, respectively. In this embodiment, the gas-liquid flow rate regulating means provided on the receiver 5 includes only the opening and closing valves 11a and 11b with the gas flow rate regulating device 10 shown in FIG. 1 removed.

A single refrigerant or at least two kinds of refrigerants being different boiling points and an amount corresponding to the maximum length of connection piping are charged in the refrigerating cycle and caused to flow through the refrigerating cycle as shown by arrows of solid and broken lines in FIG. 6.

Further, a control system is connected to these devices constituting the refrigerating cycle. The control system will be described later in detail.

Now, an action of the refrigerant in the refrigerating cycle in operation will be described. For the convenience of explanation, description will be given of heating operation on the assumption that a single refrigerant is charged in the refrigerating cycle. However, the present invention has the same effect when the refrigerant charged in the refrigerating cycle is a mixed refrigerant or cooling operation is on.

The course and action of the refrigerant flowing through the refrigerating cycle are the same as those in the embodiment of FIG. 1, and the first electronic expansion valve 20 associated with the indoor heat exchanger 3 and the second electronic expansion valve 21 associated with the outdoor heat exchanger 7 are regulated in opening degree so as to make a quantity of state of the refrigerating cycle proper.

Description will be given of a state and an effect on refrigerating cycle of the refrigerant which flows into and out of the receiver 5.

FIG. 7 is a Mollier diagram showing operation points of the refrigerating cycle provided with the variable pressure reducing device, and FIG. 8 is a graph showing a relationship between an opening degree of the electronic expansion valve 20 provided upstream of the receiver 5 with respect to a direction of flow of refrigerant, which is taken as the abscissa, and a heating capacity taken as the ordinate.

When the opening and closing valve 11b is closed in the refrigerating cycle shown in FIG. 6, the refrigerant flowing into and out of the receiver 5 is put in a saturated liquid state on a curve 3 in FIG. 7 because no gas refrigerant flows out of the receiver 5, and operation points of the refrigerating cycle are E (suction into compressor), A (discharge from compressor), B (outlet of indoor heat exchanger), C (inside receiver), and D (inlet of outdoor heat exchanger) as shown by the solid line of Mollier diagram in FIG. 7.

On the other hand, in the case where the opening and closing valve 11b is opened, a gas refrigerant flows out of the receiver 5 to increase dryness of the refrigerant flowing into and out of the receiver 5 (or decrease wetness) to put the refrigerant in a gas-liquid two-phase state on a curve 4 in FIG. 7. Therefore, the liquid refrigerant is introduced into the receiver 5 and hence an effective quantity of the refrigerant circulating through the refrigerating cycle is reduced.

Subsequently, a quantity of liquid refrigerant staying in the indoor heat exchanger 3 is decreased to thereby reduce a discharge pressure. Then, if the second electronic expansion valve 21 is adjusted in opening degree so that the refrigerant is sucked in the same manner as in the case where the opening and closing valve 11b is closed. Then a pressure at the inlet of the outdoor heat exchanger 7 becomes equal to a suction pressure of the compressor, and operation points of the refrigerating cycle are E' (suction into compressor), A' (discharge from compressor), B' (outlet of indoor heat exchanger), C' (inside of receiver), and D' (inlet of outdoor heat exchanger) as shown by the broken line in FIG. 7.

A heating capacity of the refrigerating cycle at this time is, as shown in FIG. 8, QP11 when the opening and closing valve 11b is closed and an opening degree of the first electronic expansion valve 20 is P1, while it is QP12 when the opening and closing valve 11b is opened because a quantity of the refrigerant collected and stored in the receiver 5 is increased to reduce an effective quantity of the refrigerant in the refrigerating cycle.

When an opening degree of the first electronic expansion valve 20 is increased from P1 to P2, the refrigerant in the indoor heat exchanger 3 is further collected and stored in the receiver 5 to decrease an effective quantity of the refrigerant in the refrigerating cycle, and therefore a heating capacity becomes QP21 when the opening and closing valve 11b is closed and QP22 when the opening and closing valve 11 is opened, which means that a heating capacity is further reduced as compared with the case where an opening degree of the electronic expansion valve 20 is P1. Namely, by adjusting the opening degree of the electronic expansion valve 20 provided upstream of the receiver 5 with respect to a flow direction of the refrigerant is adjusted in opening degree to enable varying a capacity of the refrigerating cycle. In addition, the opening and closing valve 11b associated with the receiver 5 is adjusted to extract the gas refrigerant from the receiver 5, whereby a capacity of the refrigerating cycle can be varied more widely.

Now, in this embodiment, a method of controlling the refrigerating cycle will be described.

FIG. 9 is a flow chart in heating operation. For the convenience of explanation, it is assumed that a quantity of state of the compressor 1, which is controlled by the second electronic expansion valve 21, is a degree of superheat of discharge gas. However, even if the second electronic expansion valve 21 controls a discharge gas temperature of the compressor, a degree of superheat on the suction side of the compressor or a degree of superheat at the outlet of the evaporator, the same effect can be obtained.

A control system of the refrigerating cycle comprises, as shown in FIG. 6, a microcomputer 16, a memory 17 connected to the microcomputer 16, an expansion valve drive circuit 13 for driving the first and second electronic expansion valves 20 and 21, an opening and closing valve drive circuit 14 for driving the opening and closing valves 11a and 11b provided in the respective bypass circuits, a room temperature detecting unit 15 for detecting suction and discharge temperatures of the indoor heat exchanger 3, temperature detectors 12a and 12b connected to the room temperature detecting unit 15, a discharge gas superheat degree detecting unit 18 for detecting a discharge gas temperature and discharge pressure of the compressor, and a discharge gas temperature detector 23 and a discharge pressure detector 24 which are connected to the discharge gas superheat degree detecting unit 18.

The discharge gas superheat degree detecting unit 18 receives detected values from the discharge gas temperature detector 23 and the discharge pressure detector 24, and converts the detected temperature and pressure into electrical signals to transmit the same to the microcomputer 16.

Description will now be given of a method of controlling the refrigerating cycle.

In heating operation, the control method is the same as that described above in connection to FIG. 5 as far as the step in which a difference between a produced capacity Q and a required capacity Qs obtained by computation is compared with a value α set beforehand in the memory 17, and therefore explanation thereof will be omitted.

In case of $(Q-Qs)<-\alpha$, it is judged first whether or not the opening and closing valve 11b is opened. If the opening and closing valve 11b is opened, it should be closed. If the opening and closing valve 11b is closed, the first electronic expansion valve 20 is closed by ΔP in opening degree.

In case of $-\alpha<(Q-Qs)<\alpha$, the operation is performed with the first electronic expansion valve 20 and the opening and closing valve 11b kept in the present conditions.

In case of $(Q-Qs)>\alpha$, it is judged first whether or not the opening and closing valve 11b is opened. If the opening and closing valve 11b is closed, it should be opened. If the opening and closing valve 11b is opened, the first electronic expansion valve 20 is opened by ΔP in opening degree so that the liquid refrigerant is stored in the receiver 5 to reduce an effective quantity of refrigerant in the refrigerating cycle to thereby lower a condensing temperature, in which conditions the operation is performed.

Then, based on a difference between a discharge gas temperature detected by the discharge gas superheat degree detecting unit 18 and inputted to the microcomputer 16 and a saturation temperature obtained from the discharge pressure, a degree of superheat of the discharge gas is computed. From the calculated degree of superheat of the discharge gas and a value stored beforehand in the memory 17, an opening degree of the second electronic expansion valve 21 is calculated by the microcomputer 16 by making use of a technique such as PID, neuro or fuzzy control. The result of the calculation is transmitted to the expansion valve drive circuit 13. As a result, the second electronic expansion valve 21 is opened at a certain opening degree and hence the degree of superheat of the discharge gas is controlled at a certain fixed value.

As described above, the opening degree of the electronic expansion valve 20 provided upstream of the receiver 5 with respect to the flow direction of refrigerant is adjusted, whereby the capacity of the refrigerating cycle can be varied depending upon the load in the air-conditioning space and it is possible to provide a pleasantly air-conditioned space without wasting energy. Moreover, by using additionally the gas bypass circuit associated with the receiver, a range in which a capacity of the refrigerating cycle can be further enlarged.

In the present invention, since the compressor is controlled by the electronic expansion valve, provided downstream of the receiver 5 with respect to the flow direction of refrigerant, to be in optimum conditions, the refrigerating cycle can be constantly operated in optimum conditions even if the effective quantity of refrigerant in the refrigerating cycle is changed, with the result that of the component devices including the compressor can be improved reliability.

Further, a gas flow rate regulating device may be provided in the bypass circuit associated with the receiver 5 in the refrigerating cycle of the present invention shown in FIG. 6, in which case the refrigerating cycle can be controlled more finely in capacity.

In addition, in the case where the refrigerant flowing into and out of the receiver is put in a state with dryness being high or wetness being low, an effective quantity of refrigerant in the refrigerating cycle is reduced to decrease a discharge pressure, so that an amount of electricity supply to the compressor is reduced. Accordingly, if a switch is provided on a remote controller or the like so that a user or other person can selectively take precedence to energy saving or capacity with respect to the operation of the refrigerating cycle, it becomes possible to operate the refrigerating cycle in various operation modes and hence it becomes possible to operate the air conditioner at the user's or other person's desire.

In this embodiment as well, the gas-liquid flow rate regulating means has been described as being constituted for regulating a quantity of gas refrigerant flowing out of the receiver, and however it may be constituted to be capable of regulating a quantity of liquid refrigerant flowing out of the receiver while keeping the gas refrigerant flowing out of the receiver constant in quantity, in which case the same effect can also be obtained.

Next, other embodiments of the gas-liquid flow rate regulating means or dryness adjusting means will be described with reference to FIGS. 10 to 13.

Figure 10:
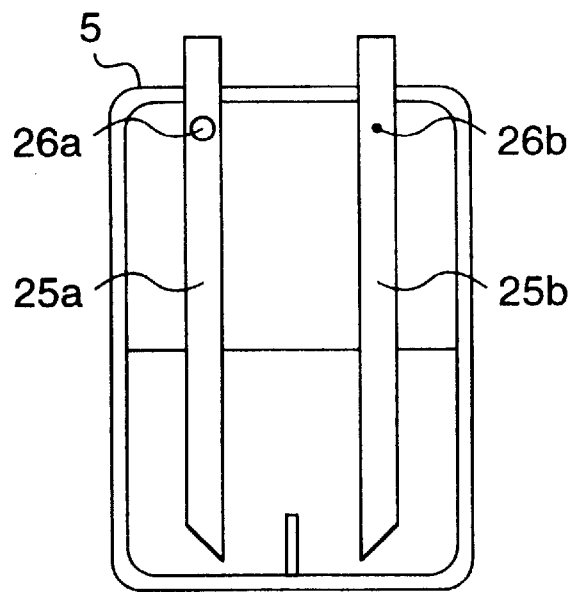
FIG. 10 is a vertical sectional view showing a concrete structure of gas-liquid flow rate regulating means provided in a refrigerating cycle according to an embodiment of the present invention, in which gas holes have different sizes.
Figure 11:
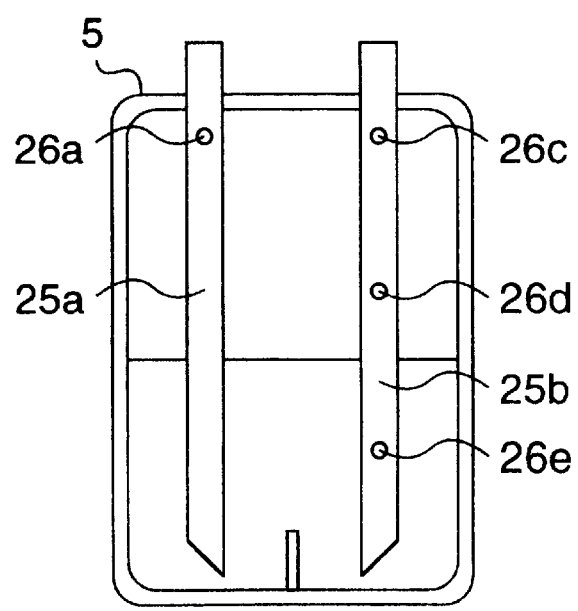
FIG. 11 is a vertical sectional view showing a concrete structure of gas-liquid flow rate regulating means provided in a refrigerating cycle according to another embodiment of the present invention, in which a number of gas holes is changed.
Figure 12:
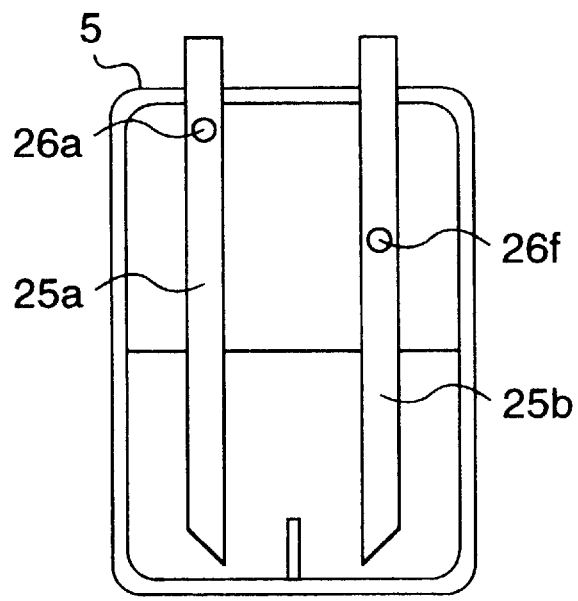
FIG. 12 is a vertical sectional view showing a concrete structure of gas-liquid flow rate regulating means provided in a refrigerating cycle according to still another embodiment of the present invention, in which positions of gas holes are changed.
Figure 13:
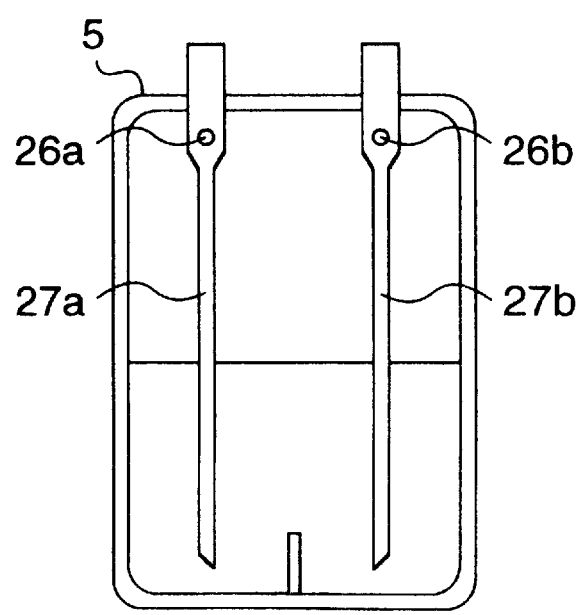
FIG. 13 is a vertical sectional view showing a concrete structure of gas-liquid flow rate regulating means provided in a refrigerating cycle according to still another embodiment of the present invention, in which refrigerant inflow/outflow pipes are made small in diameter in their lower portions.

FIG. 10 is a vertical sectional view showing a concrete structure of the gas-liquid flow rate regulating means in which the size of gas holes is varied, FIG. 11 is a vertical sectional view similar to FIG. 10 but showing a structure in which the number of gas holes is changed, FIG. 12 is a vertical sectional view similar to FIG. 10 but showing a structure in which gas holes are changed in position, and FIG. 13 is a vertical sectional view similar to FIG. 10 but showing a structure in which the lower portions of refrigerant inflow/outflow pipes are reduced in diameter.

In the gas-liquid flow rate regulating means shown in FIG. 10, the receiver 5 is provided with refrigerant inflow/outflow pipes 25a, 25b through which the refrigerant is led into and out of the receiver 5, and the refrigerant inflow/outflow pipes 25a, 25b are formed with gas holes 26a, 26b communicating with a gas space at an upper portion in the receiver 5, respectively. The refrigerant inflow/outflow pipes 25a, 25b each extend to a bottom portion of the receiver 5 at the extreme end thereof, and the gas holes 26a, 26b are formed at the same level from the bottom surface of the receiver 5. However, the gas holes have different diameters.

When the refrigerant is conducted into the receiver 5 by means of the refrigerant inflow/outflow pipe 25a, liquid refrigerant rises from the bottom portion of the receiver 5 through the refrigerant inflow/outflow pipe 25b up to the gas hole 26b. A resistance resulting from this rise causes a difference in pressure between the inside of the refrigerant inflow/outflow pipe 25b and the inside of the receiver 5 at the gas hole 26b portion. Due to this pressure difference, gas refrigerant is conducted into the refrigerant inflow/outflow pipe 25b at a certain fixed flow rate against a flow resistance determined by the size of the gas hole 26b, and mixed with the liquid refrigerant in the refrigerant inflow/outflow pipe 25b, in which state the refrigerant is drawn out of the receiver 5 through the refrigerant inflow/outflow pipe 25b.

Meanwhile, when the refrigerant is conducted into the receiver 5 through the refrigerant inflow/outflow pipe 25b, the refrigerant inflow/outflow pipes 25a and 25b function in the reverse manner to cause the refrigerant to be drawn out of the receiver 5 through the refrigerant inflow/outflow pipe 25a.

Concerning the size of the gas holes 26a, 26b, in this structure, a diameter of the gas hole 26a formed in the refrigerant inflow/outflow pipe 25a is larger than that of the gas hole 26b formed in the refrigerant inflow/outflow pipe 25b, and therefore a flow resistance, with which the gas passing through the gas hole 26a encounters, is made lower so that a quantity of the gas refrigerant passing through the gas hole 26a is greater than that of the gas refrigerant passing through the gas hole 26b. Accordingly, the refrigerant flowing out through the refrigerant inflow/outflow pipe 25a is put in a state, in which dryness is high as compared with the state of the refrigerant flowing out through the refrigerant inflow/outflow pipe 25b. Namely, the refrigerant which flows into the receiver 5 can be adjusted in dryness or wetness by changing a diameter of the gas hole formed in the refrigerant inflow/outflow pipe through which the refrigerant is conducted out of the receiver 5.

In a gas-liquid flow rate regulating means shown in FIG. 11, the refrigerant inflow/outflow pipe 25b is formed with a plurality of gas holes each having a diameter equal to that of the gas hole 26a formed in the refrigerant inflow/outflow pipe 25a. Gas holes 26c, 26d and 26e formed in the refrigerant inflow/outflow pipe 25b are positioned at different heights from the bottom surface of the receiver 5.

In the gas-liquid flow rate regulating means shown in FIG. 11, the refrigerant conducted into the receiver 5 via the refrigerant inflow/outflow pipe 25a is varied in dryness or wetness depending on the liquid surface level in the receiver 5.

When the liquid level is between the gas holes 26c and 26d, liquid refrigerant flows into the refrigerant inflow/outflow pipe 25b through the gas holes 26d and 26e, so that a quantity of the refrigerant flowing into the refrigerant inflow/outflow pipe 25b becomes greater than that of the refrigerant flowing into the refrigerant inflow/outflow pipe 25a. Accordingly, the state of the refrigerant flowing into the refrigerant inflow/outflow pipe 25b is put in a state, in which dryness of the refrigerant is small (wetness is great) as compared with that of the refrigerant flowing out through the refrigerant inflow/outflow pipe 25a.

Further, when the liquid level is below the gas hole 26e, gas refrigerant flows into through all the gas holes, and therefore the refrigerant is put in a state, in which refrigerant dryness is further greater (wetness is further smaller), and the refrigerant flows out of the receiver 5.

In a gas-liquid flow rate regulating means shown in FIG. 12, the refrigerant inflow/outflow pipe 25b is formed with a gas hole 26f, which is positioned at a different level from the gas hole 26a formed in the refrigerant inflow/outflow pipe 25a and is equal in diameter and number to those of the gas hole 25a.

In the gas-liquid flow rate regulating means shown in FIG. 12, the refrigerant conducted into the receiver 5 via the refrigerant inflow/outflow pipe 25a is put in a state, in which a resistance, with which the liquid refrigerant passing through the refrigerant inflow/outflow pipe 25b is encountered, is made smaller than that one, with which the liquid refrigerant passing through the refrigerant inflow/outflow pipe 25a is encountered, because the gas hole 26f formed in the refrigerant inflow/outflow pipe 25b is positioned at a lower level from the bottom surface of the receiver 5 than that of the gas hole 26a formed in the refrigerant inflow/outflow pipe 25a. Therefore, a difference in pressure between the inside of the refrigerant inflow/outflow pipe 25b and the inside of the receiver 5 becomes small, so that the gas refrigerant conducted into the refrigerant inflow/outflow pipe 25b through the gas hole 26f is reduced in quantity and put in a state, in which the refrigerant dryness is small (wetness is great) as compared with that of the refrigerant flowing out through the refrigerant inflow/outflow pipe 25a, to flow out of the receiver 5.

In a gas-liquid flow rate regulating means shown in FIG. 13, there are provided small-diameter refrigerant inflow/outflow pipes 27a and 27b, of which portions below the gas hole are reduced in diameter.

In the gas-liquid flow rate regulating means shown in FIG. 13, resistance, with which the liquid refrigerant passing through the small-diameter refrigerant inflow/outflow pipes 27a, 27b is encountered, is increased due to reduction in pipe diameter, so that a pressure difference between liquid heads produced when the liquid level varies can be canceled. Accordingly, even if the liquid level varies, the refrigerant dryness or wetness can be kept stable constantly.

As described above, by changing a diameter, position and number of the gas hole or holes formed in the refrigerant inflow/outflow pipes and a diameter of the refrigerant inflow/outflow pipes, it is possible to put the refrigerant in a state which involves every possible dryness or wetness. As a needle or the like mechanism may be provided in the gas hole as a mechanism for varying a diameter of the gas hole, in which case the needle or the like may be actuated electrically or by a mechanism utilizing changes in liquid level.

Now, description will be given of still another embodiment of the present invention with reference to FIG. 14.

Figure 14:
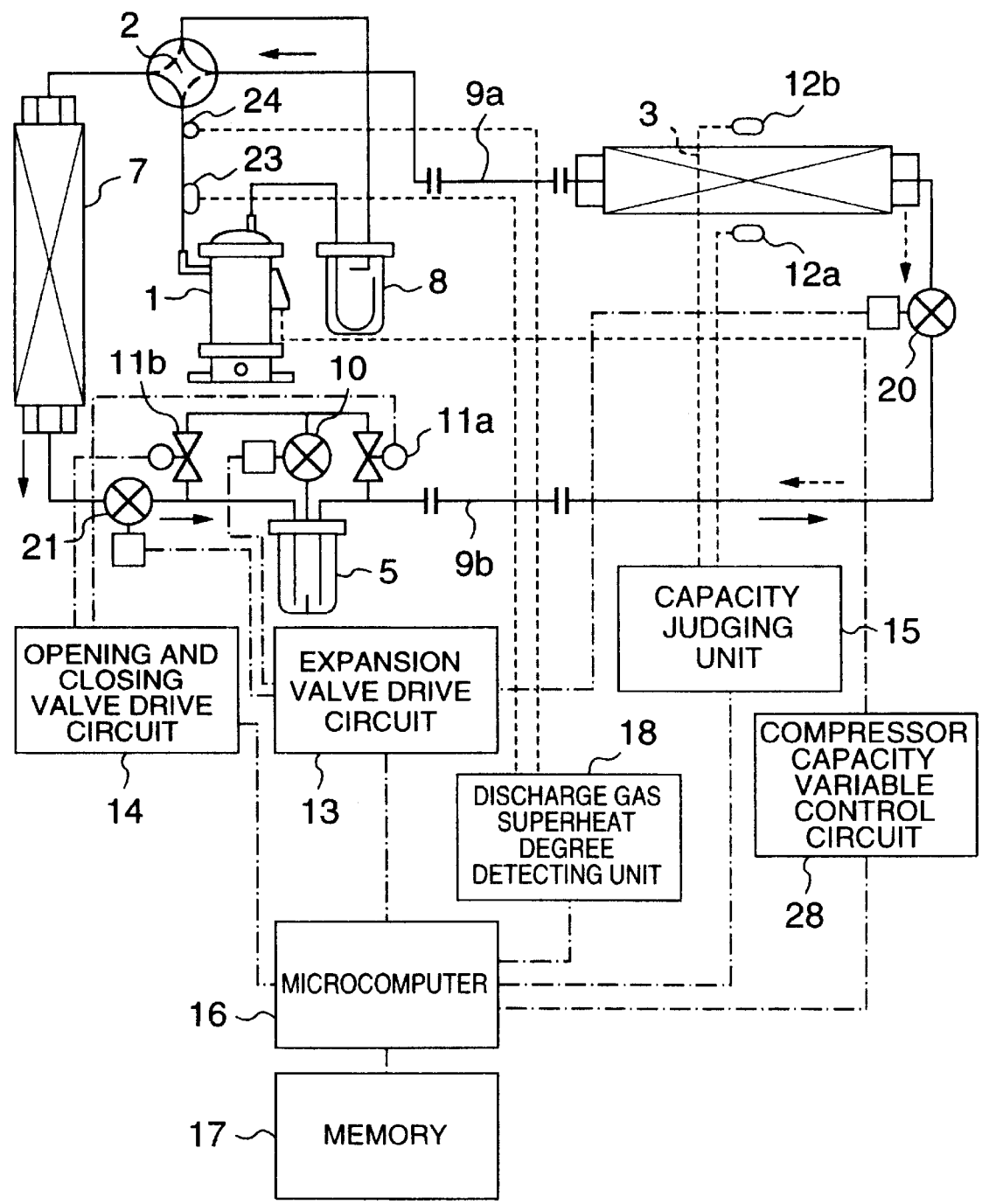
FIG. 14 is a schematic view of a capacity control cycle provided with compressor capacity control means according to still another embodiment of a refrigerating cycle of the present invention.

FIG. 14 is a schematic view of a capacity control cycle comprising in combination means for varying revolution speed of a compressor and a gas-liquid flow rate regulating means.

A refrigerating cycle of this embodiment comprises a compressor 1 having means for varying revolution speed or compression capacity of a compressor (an inverter, for example). A gas flow rate regulating device 10 associated with a receiver 5, a first pressure reducing device 20 and a second pressure reducing device 21 are each constituted by an electronic expansion valve. A single refrigerant or at least two kinds of refrigerants of different boiling points are charged in the refrigerating cycle to have an amount corresponding to the maximum length of connection piping, and to flow through the refrigerating cycle as shown by arrows of solid and broken lines similarly to FIG. 6.

Further, a control system is connected to these components constituting the refrigerating cycle. A compressor capacity variable control circuit 28 is connected to the compressor 1 for controlling the revolution speed or compression capacity of the compressor. The compressor capacity variable control circuit 28 is connected to a microcomputer 16 by means of a signal line.

Now, an action of the refrigerant in the refrigerating cycle in operation will be described. For the convenience of explanation, description will be given of only a case of heating operation on the assumption that a single refrigerant is sealed in the refrigerating cycle.

The course and action of the refrigerant flowing through the refrigerating cycle are the same as those in the embodiment of FIG. 1, and a first electronic expansion valve 20 associated with the indoor heat exchanger 3 and a second electronic expansion valve 21 associated with the outdoor heat exchanger 7 are adjusted in opening degree so as to make a quantity of state of the refrigerating cycle appropriate.

In the refrigerating cycle of this embodiment, the refrigerating cycle can be widened in a variable range of capacity by combining the variable capacity control effected by the gas flow rate regulating device 10 associated with the receiver 5 or the variable capacity control effected by adjustment of an opening degree of the first electronic expansion valve 20 associated with the indoor heat exchanger 3, with a variable capacity mechanism by which a capacity is varied by varying a revolution speed and the compression capacity of the compressor to regulate a quantity of the refrigerant circulating through the refrigerating cycle.

When it is intended to reduce a capacity of the refrigerating cycle to a minimum, a revolution speed or a compression capacity of the compressor is reduced to a minimum, a valve opening degree of the gas flow rate regulating device 10 is increased to a maximum to make dryness of the refrigerant flowing into and out of the receiver 5 great (wetness is low), a part of the refrigerant in the indoor heat exchanger 3 is collected and stored in the receiver 5, and an opening degree of the first electronic expansion valve 20 is increased to a maximum to cause the refrigerant in the indoor heat exchanger 3 to be further stored in the receiver 5, thereby reducing an effective quantity of the refrigerant circulating through the refrigerating cycle. In this manner, a capacity of the refrigerating cycle can be minimized.

On the other hand, when it is intended to increase a capacity of the refrigerating cycle to a maximum, a revolution speed or a compression capacity of the compressor is increased to a maximum, a valve opening degree of the gas flow rate regulating device 10 is reduced to a minimum to make a quantity of the gas refrigerant flowing out of the receiver 5 zero, the opening and closing valve 11b is closed as to make dryness of the refrigerant flowing into and out of the receiver 5 small (wetness is great), and an opening degree of the first electronic expansion valve 20 is so adjusted to cause the refrigerant to be stored in the indoor heat exchanger 3, thereby increasing an effective quantity of the refrigerant circulating through the refrigerating cycle. In this way, a capacity of the refrigerating cycle can be maximized.

As described above, in the refrigerating cycle of this embodiment, a range of a capacity of the refrigerating cycle can be greatly enlarged by controlling a capacity of the compressor, regulating a quantity of the gas refrigerant flowing out of the receiver and adjusting an opening degree of the electronic expansion valve provided upstream of the receiver with respect to the direction of flow of the refrigerant. Accordingly, pleasantness of the air-conditioned space can be maintained even if a load in the air-conditioning space becomes larger than required, and the refrigerating cycle never be stopped even if a load in the air-conditioning space becomes smaller than required.

In this embodiment, the gas-liquid flow rate regulating means has been described as being constituted to regulate a quantity of the gas refrigerant flowing out of the receiver, and however it may be constituted to be capable of regulating a quantity of the liquid refrigerant flowing out of the receiver while keeping an amount of the gas refrigerant flowing out of the receiver constant.

Further, in the case where at least two kinds of refrigerants having different boiling points are mixed for a cooling fluid used in the refrigerating cycle of the above embodiment, by adjusting opening degrees of the first and second pressure reducing devices to cause excess refrigerant to be stored in the accumulator, a proportion of the low boiling-point refrigerant can be made larger in a composition of the refrigerant circulating through the refrigerating cycle than in a composition of the refrigerant charged in the refrigerating cycle.

For example, in the case where the refrigerant is composed of a mixture of difluoromethane and 1,1,1,2-tetrafluoroethane, a proportion difluoromethane increases when the excess refrigerant is stored in the accumulator. Since difluoromethane is a refrigerant of the type having a large quantity of latent heat and a small specific volume, it enables the refrigerating cycle to generate an increased power provided that the same compressor is used.

Namely, a capacity of the refrigerating cycle can be increased and decreased by changing a composition of the refrigerant circulating through the refrigerating cycle.

The same effect can be obtained in the case where the mixed refrigerant comprises a mixture of difluoromethane, 1,1,1,2-tetrafluoroethane and pentafluoroethane, or a mixture of 1,1,1,2-tetrafluoroethane and 1,1,1-trifluoroethane, or a mixture of mixing 1,1,1,2-tetrafluoroethane, pentafluoroethane and 1,1,1-trifluoroethane for other types of mixed refrigerants.

Further, in the case where the refrigerants of HFC family containing no chlorine and including difluoromethane, 1,1, 1,2-tetrafluoroethane, pentafluoroethane and 1,1,1-trilurorethane are used as the cooling fluid used in the refrigerating cycle of the above embodiment, it is possible to provide an air conditioner which avoids destruction of the ozone layer and will do no harm to the global environment and in which capacity control can be performed in a wide range according to a load.

Moreover, in the case where electronic expansion valves are used as the first and second pressure reducing devices in the above-described refrigerating cycle, increasing an opening degree of the second pressure reducing device in heating operation and an opening degree of the first pressure reducing device in cooling operation reduce a resistance at the pressure reducing device to increase a quantity of the refrigerant flowing through the refrigerating cycle. Therefore, the refrigerant is not allowed to evaporate in the evaporator, so that an amount of liquid flowing into the accumulator becomes greater than that of liquid returning from the accumulator to the compressor. In consequence, all the liquid refrigerant stored in the receiver moves into the accumulator, with the result that the receiver has no liquid refrigerant and permits the gas refrigerant to be sucked even through the extreme end of the refrigerant inflow/outflow pipe provided in the receiver.

As a result, the refrigerant flowing into and out of the receiver is put in a state where the refrigerant dryness is further great (wetness is further small), which makes it possible to further reduce a capacity of the refrigerating cycle and hence to still more enlarge a range of capacity control of the refrigerating cycle.

In addition, reduction in an effective quantity of the refrigerant circulating through the refrigerating cycle causes the pressure on the discharge side to decrease. For this reason, even in the case where a refrigerant having a low boiling point, such as difluoromethane or pentafluoroethane, for example, in used in the refrigerating cycle, or a mixture of difluoromethane and pentafluoroethane is used, operation of the refrigerating cycle can be performed without needing any substantial change in the anti-pressure design of the devices as compared with the case of using R22, and therefore it is possible to enlarge an operation range of the refrigerating cycle.

According to the present invention, even with a capacity control device in a refrigerating cycle having a compressor provided with a constant speed type motor, it is possible to provide a refrigerating cycle a capacity of which can be varied continuously without increasing a quantity of refrigerant and which can be kept in stable conditions. Further, in a refrigerating cycle having a compressor revolution speed variable control device, it is possible to provide a capacity control device in a refrigerating cycle which is capable of performing capacity control over a remarkably enlarged operation range.

What is claimed is:

1. In a capacity control device in a refrigerating cycle in which a compressor, an indoor heat exchanger, an outdoor heat exchanger, a first pressure reducing device provided on the indoor heat exchanger side, and a second pressure reducing device provided on the outdoor heat exchanger side are connected one by one by means of piping, and a receiver is provided between the indoor and outdoor heat exchangers, the improvement comprising a gas-liquid flow rate regulating means associated with said receiver for regulating at least either of liquid flow rate and gas flow rate of a cooling fluid which flows into and out of said receiver, and wherein an effective quantity of refrigerant is varied to change a condensing temperature in the indoor heat exchanger in accordance with a produced capacity relative to a required capacity.

2. In a capacity control device in a refrigerating cycle in which a compressor, an indoor heat exchanger, an outdoor heat exchanger, a first pressure reducing device provided on the indoor heat exchanger side, and a second pressure reducing device provided on the outdoor heat exchanger side are connected one by one by means of piping, and a receiver is provided between the indoor and outdoor heat exchangers, the improvement comprising a dryness adjusting means associated with said receiver for adjusting dryness of a cooling fluid which flows into and out of said receiver, and wherein the dryness is varied to change a condensing temperature in the indoor heat exchanger in accordance with a produced capacity relative to a required capacity.

3. In a capacity control device in a refrigerating cycle in which a compressor, an indoor heat exchanger, an outdoor heat exchanger, a first pressure reducing device provided on the indoor heat exchanger side, and a second pressure reducing device provided on the outdoor heat exchanger side are connected one by one by means of piping, and a receiver having refrigerant inflow/outflow pipes is provided between the indoor and outdoor heat exchangers, the improvement comprising dryness adjusting means for adjusting a dryness of refrigerant flowing out of the receiver in both heating and cooling operations, said dryness adjusting means comprising at least one gas hole provided in each of the refrigerant inflow/outflow pipes, by which a main pipe of the refrigerating cycle is connected to an inside of said receiver, said at least one gas hole communicating with an upper gas portion in said receiver.

4. In a capacity control device in a refrigerating cycle in which a compressor, an indoor heat exchanger, an outdoor heat exchanger, a first pressure reducing device provided on the indoor heat exchanger side, and a second pressure reducing device provided on the outdoor heat exchanger side are connected one by one by means of piping, and a receiver is provided between the indoor and outdoor heat exchangers, the improvement comprising gas hole means formed in a refrigerant inflow/outflow pipes, by which a main pipe of the refrigerating cycle is connected to an inside of said receiver, said gas hole means communicating with an upper gas portion of said receiver, and fine-diameter refrigerant inflow/outflow pipes formed by reducing a diameter of portions of the refrigerant inflow/outflow pipes below said gas hole means.

5. In a capacity control device in a refrigerating cycle in which a compressor, an indoor heat exchanger, an outdoor heat exchanger, a first pressure reducing device provided on the indoor heat exchanger side, and a second pressure reducing device provided on the outdoor heat exchanger side are connected one by one by means of piping, and a receiver is provided between the indoor and outdoor heat exchangers, the improvement comprising a bypass pipe provided for bypassing gas in said receiver downstream of a refrigerant inflow/outflow pipes, by which a main pipe of the refrigerating cycle is connected to an inside of said receiver, or the main pipe with respect to a direction of flow, and at least a gas flow rate regulating valve provided on said bypass pipe for regulating a gas flow rate.

6. A capacity control device in a refrigerating cycle according to one of claims 1 to 5, wherein said first and second pressure reducing devices comprise an electronic expansion valve capable of adjusting an amount of pressure reduction.

7. A capacity control device in a refrigerating cycle according to one of claims 1 to 5, wherein said first and second pressure reducing devices comprises an electronic expansion valve capable of adjusting an amount of pressure reduction, and a mixture of at least two kinds of refrigerants having different boiling points is used for the cooling fluid.

8. A capacity control device in a refrigerating cycle according to one of claims 1 to 5, wherein said first and second pressure reducing devices comprise an electronic expansion valve capable of adjusting an amount of pressure reduction amount, and a mixture of at least two kinds of refrigerants having different boiling points is used for the cooling fluid, and wherein components of said mixture include difluoromethane, 1,1,1,2-tetrafluoroethane, pentafluoroethane and 1,1,1-trifluoroethane.

9. A capacity control device in a refrigerating cycle according to one of claims 1 to 5, wherein said first and second pressure reducing devices comprise a capillary tube having a fixed resistance.

10. A capacity control device in a refrigerating cycle according to one of claims 1 to 5, wherein said first and second pressure reducing devices comprise a capillary tube having a fixed resistance, and a mixture of at least two kinds of refrigerants having different boiling points is used for the cooling fluid.

11. A capacity control device in a refrigerating cycle according to one of claims 1 to 5, wherein said first and second pressure reducing devices comprise a capillary tube having a fixed resistance, and a mixture of at least two kinds of refrigerants having different boiling points is used for the cooling fluid, and wherein components of said mixture include difluoromethane, 1,1,1,2-tetrafluoroethane, pentafluoroethane and 1,1,1-trifluoroethane.

12. A capacity control device in a refrigerating cycle according to one of claims 1 to 5, further comprising a revolution speed varying means for varying a revolution speed of said compressor.

13. A capacity control device in a refrigerating cycle according to one of claims 1 to 5, further comprising a revolution speed varying means for varying a revolution speed of said compressor, and wherein a mixture of at least two kinds of refrigerants having different boiling points is used for the cooling fluid.

14. A capacity control device in a refrigerating cycle according to one of claims 1 to 5, further comprising a revolution speed varying means for varying revolution speed of said compressor, and wherein a mixture of at least two kinds of refrigerants with different boiling points is used for the cooling fluid, and components of said mixture include difluoromethane, 1,1,1,2-tetrafluoroethane, pentafluoroethane and 1,1,1-trifluoroethane.

15. A capacity control device in a refrigerating cycle according to one of claims 1 to 5, wherein a revolution speed of said compressor is kept constant.

16. A capacity control device in a refrigerating cycle according to one of claims 1 to 5, wherein a revolution speed of said compressor is kept constant, and a mixture of at least two kinds of refrigerants having different boiling points is used for the cooling fluid.

17. A capacity control device in a refrigerating cycle according to one of claims 1 to 5, wherein a revolution speed of said compressor is kept constant, and a mixture of at least two kinds of refrigerants having different boiling points is used for the cooling fluid, and wherein components of said mixture include difluoromethane, 1,1,1,2-tetrafluoroethane, pentafluoroethane and 1,1,1-trifluoroethane.

18. A capacity control device in a refrigerating cycle according to one of claims 1 to 5, wherein said receiver is provided between said first and second pressure reducing devices.

* * * * *